Sept. 9, 1947.  G. E. MAWHIRTER  2,427,061
PISTON AND ROD CONNECTION
Filed Oct. 26, 1945

INVENTOR
GLENN E. MAWHIRTER,
BY
ATTORNEYS

Patented Sept. 9, 1947

2,427,061

UNITED STATES PATENT OFFICE 2,427,061

PISTON AND ROD CONNECTION

Glenn E. Mawhirter, Pawnee Rock, Kans.

Application October 26, 1945, Serial No. 624,682

3 Claims. (Cl. 309—17)

This instant invention relates to stuffing boxes for pistons especially those used in liquid pumping wells and its main object is the provision of a stuffing that will supplant the present type and the polish rod.

Another object of the invention is the provision of a stuffing box that will not burn up the rubber or other packing when the well goes dry.

Still another object of the invention is the provision of a stuffing box that lessens the strain on the pumping rod and requires less attention than conventional stuffing boxes.

A further object of the invention is the provision of a stuffing box that enables the piston equipped therewith to support an ample supply of lubricating material for constant lubrication.

With these and other objects in view, the invention also consists in certain other features of construction and in the combination and arrangement of the several parts to be hereinafter fully described, illustrated in the accompanying drawing and specifically pointed out in the appended claims.

Figure 1:
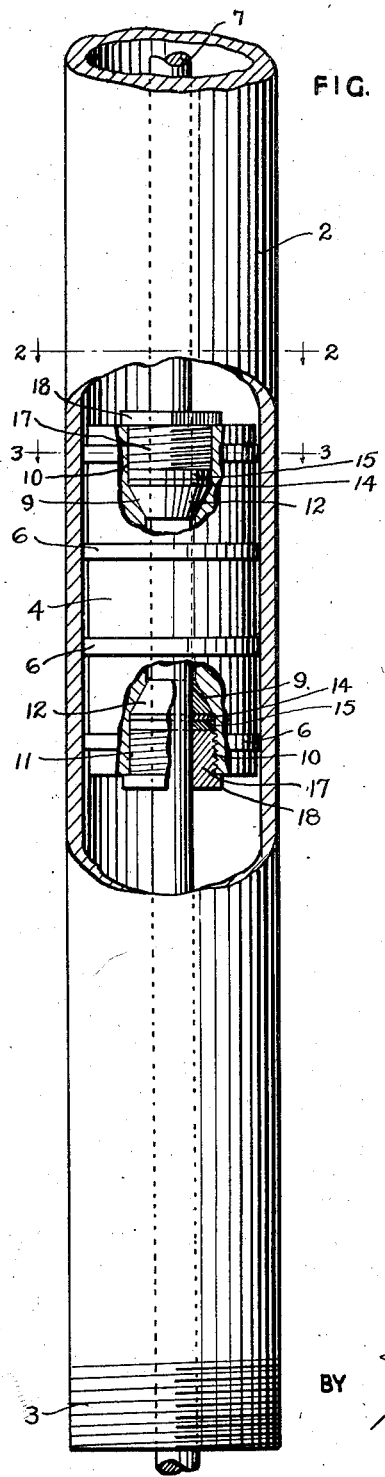
Figure 2:
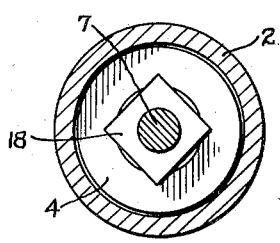
Figure 3:
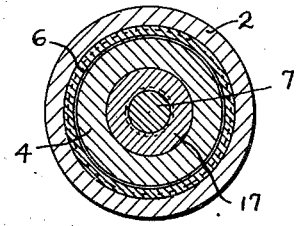

In describing the invention in detail, reference will be had to the accompanying drawings in which:

Figure 1 is side elevation, partly broken away, of the preferred embodiment of my invention;

Figures 2 and 3 are transverse sections on lines 2—2 and 3—3 respectively of Figure 1.

In the drawing in which like characters of reference designate like or similar parts, 2 denotes a metal piston sleeve having threads 3 at its lower end for connection to a well head (not shown) and housing a metal piston 4 for sliding motion. In the cylindrical surface of the piston are formed a plurality of grooves each receiving a conventional metal piston ring 6 which resiliently presses against the inner surface of the sleeve.

The piston has a central, axial opening for a pump rod 7 which is connected at the upper end to a pump jack (not shown) and at its lower end to the pump (not shown). Both end portions of the pump rod opening are enlarged so as to provide frusto-conical spaces 9 communicating with the intermediate part of the opening of reduced size and just permitting the insertion of the pump rod. At its outer end the conical space 9 communicates with a cylindrical space 11. The wall of that space is threaded.

Either conical space receives a pair of wedgelike conical halves 12 of steel, each having a semicylindrical concave surface that surrounds in assembled condition one-half of the pump rod. Above the upper and below the lower pair of the conical wedges is placed a steel washer 14, followed by a lead washer 15. The assembly is completed by a pair of exteriorly threaded and centrally apertured plugs 17, each fitting the threads of a space 11 and carrying a square flange 18 at their outer end.

The piston sleeve below the piston is filled with the liquid of the well and the sleeve portion above the piston is filled with lubricating oil which cannot leak downward between the interior surface of the sleeve and exterior surface of the piston because of the piston rings. The above described connection between the piston and pump rod also prevents leakage.

It will also be understood that the improved structure above described and illustrated is capable of many modifications within the scope of my invention as herein set forth and claimed.

What I claim as new and desire to secure by Letters Patent of the United States is as follows:

1. In a pumping assembly, a piston sleeve, a piston slidable in the sleeve and having a central, axial opening with enlarged end portions, a pumping rod extending through the opening, wedge means in the end portions of the opening, washers coacting with the wedge means and rod, a threaded means coacting with the end portions of the opening.

2. In a pumping assembly, a piston sleeve, a piston slidable in the sleeve and having a central, axial opening with enlarged end portions, a pumping rod extending through the opening, steel wedge means in the end portions of the opening, a steel washer surrounding the rod and adjacent a wedge means, a lead washer surrounding the rod and adjacent the steel washer, and a pair of screw plugs, each threaded in an end portion of the opening and engaging a lead washer.

3. In a pumping assembly, a piston sleeve, a piston slidable in the sleeve, a central, axial opening in the piston having a narrow intermediate portion, a conical part at either end of the intermediate portion, and an outer cylindrical interiorly threaded part at either end of the opening, a pumping rod fitting the intermediate portion of the opening, a pair of conical wedge halves in either conical part of the opening, a steel washer surrounding the rod and contacting a pair of wedge halves, a lead washer surrounding the rod and contacting a steel washer, and a packing nut threaded in the cylindrical part of the opening.

GLENN E. MAWHIRTER.

REFERENCES CITED

The following references are of record in the file of this patent:

UNITED STATES PATENTS

| Number | Name | Date |
|---|---|---|
| 2,164,159 | Millmine | June 27, 1939 |
| 1,977,075 | Magnuson | Oct. 16, 1934 |
| 2,025,288 | Johnson | Dec. 24, 1935 |